(12) United States Patent  
Nishidate

(10) Patent No.: US 7,152,233 B2
(45) Date of Patent: Dec. 19, 2006

(54) DISK PLAYER

(75) Inventor: Tetsuo Nishidate, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 384 days.

(21) Appl. No.: 10/882,349

(22) Filed: Jul. 2, 2004

(65) Prior Publication Data
US 2005/0005277 A1 Jan. 6, 2005

(30) Foreign Application Priority Data
Jul. 3, 2003 (JP) ............ P.2003-191333

(51) Int. Cl.
G11B 17/035 (2006.01)
(52) U.S. Cl. ...................... 720/601
(58) Field of Classification Search ............ 720/601, 720/605, 608, 610, 619, 622
See application file for complete search history.

(56) References Cited

FOREIGN PATENT DOCUMENTS

JP      A-10-143964      5/1998

Primary Examiner—Hoa Thi Nguyen
Assistant Examiner—Mark Blouin
(74) Attorney, Agent, or Firm—Morgan, Lewis, Bockius LLP

(57) ABSTRACT

A pair of left and right pressing pieces and to press down the front part of the upward moving drive chassis are provided so as to protrude from the front part of the casing integrally therewith, the left side pressing piece of both the corresponding pressing pieces and is formed so as to be resiliently displaced with a protruding portion erected at the tip end thereof, and the inner side of the corresponding protruding portion is made into an inclined pressing plane which is inclined in the left direction at a prescribed angle so that it is turned downward so as to be widened outwardly, the front part side edge of the upward moving drive chassis is formed so as to be resiliently brought into contact with the inclined pressing plane thereof.

9 Claims, 8 Drawing Sheets

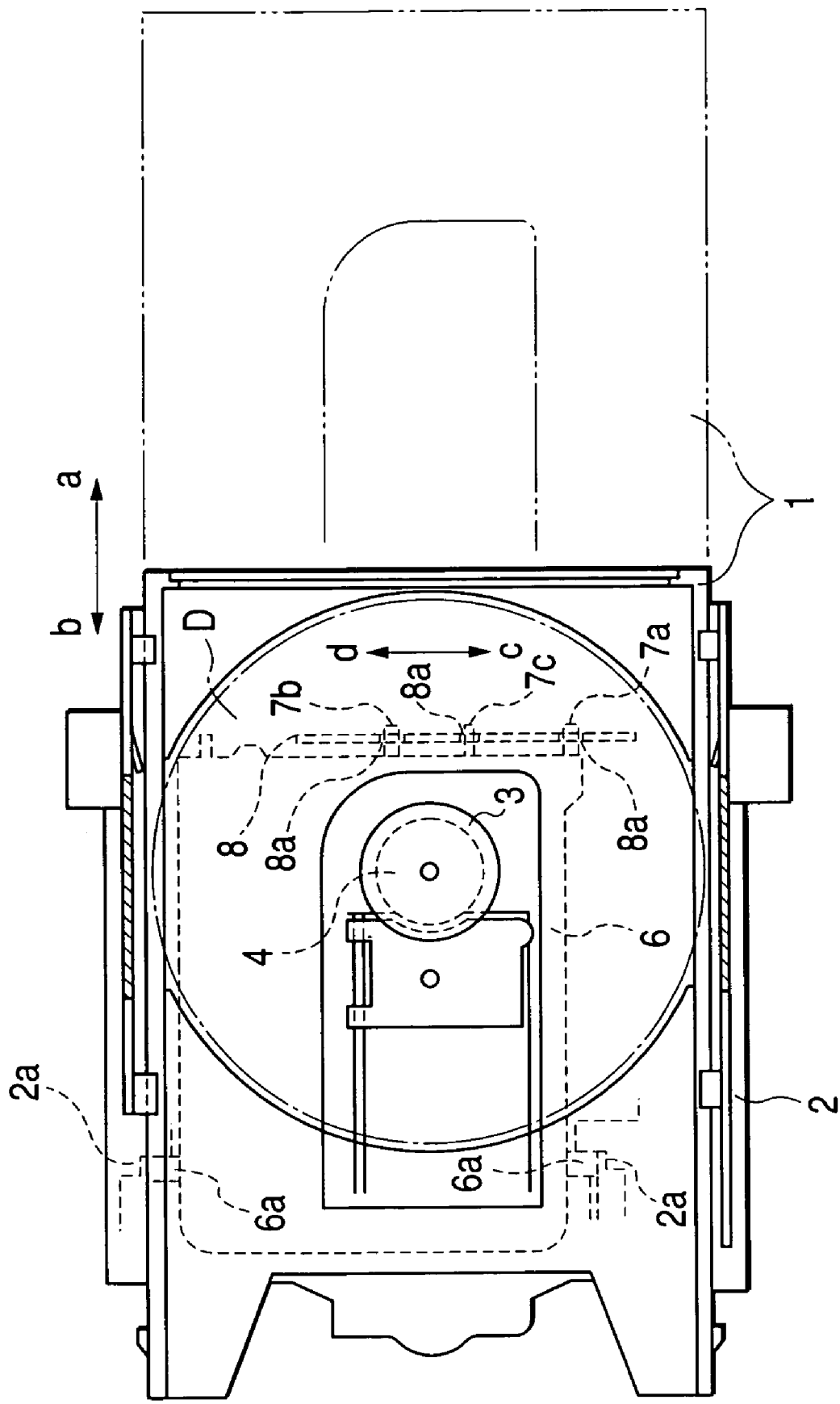

DISK PLAYER

BACKGROUND OF THE INVENTION

1. Field of the Invention

The present invention relates to a disk player for reproducing, recording or deleting an optical disk and opto-magnetic disk (hereinafter merely called a "disk") such as a CD and a DVD.

2. Description of the Related Art

Conventionally, an art described in JP-A-10-143964 is available as a technology of disk players. A description is given of one example thereof with reference to FIGS. 8, 9A and 9B. In the art, a synthetic resin-made casing 2 for supporting a tray 1 so as to advance forward (a) and retreat backward (b); a pair of left and right pivotal support axes 6a protruding from the base end portion of a drive chassis 6 having a spindle motor 4 with a turntable 3 and an optical pickup 5 incorporated are fitted to bearings 2a secured at the rear part of the casing 2. At the same time, a pair of fixing cam shafts 7a and 7b, which protrude from the tip end portion of the corresponding drive chassis 6, and a movable cam shaft 7c are fitted into the cam hole 8a of the cam plate 8 disposed at the front part of the casing 2 so as to be slidable in the left (c) and right (d) directions orthogonal to the forward (a) and backward (b) directions, whereby the drive chassis 6 is incorporated in the casing 2 so that it can move vertically (upward (e) and downward (f)) around the pivotal support axes 6a. Further, in FIGS. 9A and 9B, reference number 10 denotes a disk holder with a magnet 12, which is disposed so as to be able to elevate in the central accommodation portion 11 of the top plate portion 2b secured above the casing 2 opposite the turntable 3. And, a disk D on the tray 1 is held between the disk holder 10 and the turntable 6 (Refer to FIG. 9A).

A description is given of an unloading operation. By causing the cam plate 8 to slide in the right (d) direction from the state shown with solid lines in FIG. 8 and the state shown in FIGS. 9A and 9B, the drive chassis 6 is caused to move downward (e) around both pivotal support axes 6a via the respective cam holes 8a and respective cam axes 7a through 7c (Refer to FIG. 9B), and continuously the tray 1 is caused to advance forward (a).

As regards a loading operation, after the tray 1 is retreated (b) from the state shown in FIG. 9B in almost the reverse procedure of the above description, the cam plate 8 is caused to slide in the left (c) direction, whereby the drive chassis 6 is moved upward (f) around both pivotal support axes 6a via the respective cam holes 8a and respective cam shafts 7a through 7c (Refer to FIG. 9A), and a disk D on the tray 1 is chucked by the turntable 3 and disk holder 10. After that, the disk D is rotated at a high-speed by a spindle motor 4 via the turn table 3, and information recorded in the corresponding disk D is read.

With the above-described conventional construction, vibrations of the corresponding spindle motor 4 are transmitted to the drive chassis 6 when the disk D is rotated at a high speed by the spindle motor 4 via the turntable 3, and vibrations of the drive chassis 6 are further transmitted to the optical pickup 5, wherein the optical pickup 5 does not smoothly follow the tracks, and noise is generated in, for example, reproduced images.

Therefore, a pressing piece is provided so as to protrude from the front part of the casing 2, and the front part of the upward moving drive chassis is brought into contact with the underside of the pressing piece. Hereby, although it can be considered that vibrations of the corresponding drive chassis 6 are suppressed by the pressing force generated, the pressing force is liable to be lowered since the pressing piece is plastically deformed upward, wherein it becomes difficult to suppress the vibrations of the drive chassis 6 in a comparatively short time.

SUMMARY OF THE INVENTION

Therefore, in view of the above-described shortcomings, it is an object of the invention to provide a disk player which is devised so as to be able to suppress vibrations of the drive chassis for a prolonged period.

In order to achieve the above-described object, the first aspect of the invention is a disk player in which a casing for supporting a tray so as to cause the same to advance and retreat is provided; a pair of left and right pivotal supporting axes protruding from the base end portion of a drive chassis having a spindle motor with a turntable and an optical pickup mounted thereon are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing; the tray is caused to advance on the basis of an unloading signal after the cam plate is caused to slide in one direction and the drive chassis is moved downward around both the pivotal supporting axes; and the drive chassis is moved upward on the basis of a loading signal around both the pivotal supporting axes by causing the cam plate to slide in the other direction after the tray is retreated; which is featured in that a pair of left and right pressing pieces to press down the front part of the upward moving drive chassis are provided so as to protrude from the front part of the casing integrally therewith, one of both the pressing pieces is formed so as to be resiliently displaced with a protruding portion erected at the tip end thereof, and the inner side of the protruding portion is made into an inclined pressing plane which is inclined sideward at a prescribed angle so that it is turned downward so as to be widened outwardly; the front part side edge of the upward moving drive chassis is formed so as to be resiliently brought into contact with the inclined pressing plane thereof, and the rear end face of the protruding portion is made into an inclined guide plane that is turned downward at a prescribed angle in the forward direction to be inclined downward so as to be widened outwardly; and the inclined guide plane is devised to be resiliently pressed up from the front edge of the drive chassis incorporated in the casing.

The above-described construction corresponds to the first embodiment (Refer to FIG. 1 through FIGS. 4A to 4C). According to the construction, the front side edge of the drive chassis is resiliently brought into contact with a pressing plane inclined at a prescribed angle, which is turned downward so as to be widened outwardly, toward the side of one pressing piece when the drive chassis is moved upward and a disk is rotated at a high speed by a spindle motor via a turntable. Therefore, since a resilient contacting state can be maintained between the above-described inclined pressing plane and the front side edge of the drive chassis even if, for example, one pressing piece is plastically deformed upward, vibrations of the drive chassis can be suppressed without fail for a prolonged period, whereby an optical pickup can precisely follow the tracks, and for example, noise-free high quality images can be reproduced.

Also, the inclined guide plane of the protruding portion is resiliently pushed up by the front edge of the drive chassis, and there is no case where the corresponding protruding portion hinders advancement of the drive chassis. Therefore, it is possible to easily and quickly carry out assembly of the drive chassis.

Furthermore, by adding slight machining to one pressing piece, it is possible to form the inclined pressing plane and inclined guide plane. The machining requires almost no trouble, and the number of components is not increased. Therefore, the construction is economical.

The second aspect of the invention is a disk player in which a casing for supporting a tray so as to cause the same to advance and retreat is provided; a pair of left and right pivotal supporting axes protruding from the base end portion of a drive chassis having a spindle motor with a turntable and an optical pickup mounted thereon are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing; the tray is caused to advance on the basis of an unloading signal after the cam plate is caused to slide in one direction and the drive chassis is moved downward around both the pivotal supporting axes; and the drive chassis is moved upward on the basis of a loading signal around both the pivotal supporting axes by causing the cam plate to slide in the other direction after the tray is retreated; which is featured in that a pair of left and right pressing pieces to press down the front part of the upward moving drive chassis are provided so as to protrude from the front part of the casing integrally therewith, both the pressing pieces are formed so as to be resiliently displaced with a protruding portion erected at the tip ends thereof, and the inner sides of the protruding portions are made into inclined pressing planes which are inclined side ward at a prescribed angle so that they are turned downward so as to be widened outwardly; both the front part side edges of the upward moving drive chassis are formed so as to be resiliently brought into contact with both the inclined pressing planes thereof, and the rear end faces of the respective protruding portions are made into inclined guide planes that are turned downward at a prescribed angle in the forward direction to be inclined downward so as to be widened outwardly; and the inclined guide planes are devised to be resiliently pressed up from the front edge of the drive chassis incorporated in the casing.

The above-described construction corresponds to the second embodiment (Refer to FIG. 5), with which it is possible to obtain effects similar to those of the first aspect of the invention. In particular, since the front part of the drive chassis is nipped at both sides thereof by the inclined pressing planes of both the pressing pieces, a resilient contacting state between both the inclined pressing planes and both side edges of the front part of the drive chassis can be maintained, for example, even if both the pressing pieces are resiliently deformed upward. Therefore, it becomes possible to further securely suppress vibrations of the drive chassis for a prolonged period.

The third aspect of the invention is a disk player in which a casing for supporting a tray so as to cause the same to advance and retreat is provided; a pair of left and right pivotal supporting axes protruding from the base end portion of a drive chassis having a spindle motor with a turntable and an optical pickup mounted thereon are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing; the tray is caused to advance on the basis of an unloading signal after the cam plate is caused to slide in one direction and the drive chassis is moved downward around both the pivotal supporting axes; and the drive chassis is moved upward on the basis of a loading signal around both the pivotal supporting axes by causing the cam plate to slide in the other direction after the tray is retreated; which is featured in that a pair of left and right pressing pieces to press down the front part of the upward moving drive chassis are provided so as to protrude from the front part of the casing integrally therewith, one of both the pressing pieces is formed so as to be resiliently displaced with a protruding portion erected at the tip end thereof; a recess is formed on the underside of the protruding portion opposite the cam shaft, and both the inner sides of the recess are made into inclined pressing planes which are narrowed down upwardly; the cam shaft of the upward moving drive chassis is fitted into the recess and the outer circumferential surface of the cam shaft is formed so as to be brought into contact with both the inclined pressing planes.

The above-described construction corresponds to the third embodiment (Refer to FIGS. 6A to 6C). The construction can bring about effects similar to those of the first aspect. In particular, since the cam shaft of the drive chassis is resiliently brought into contact with both the inclined pressing planes, which are inclined so as to be narrowed upward, of one pressing piece, a resilient contacting state between both the inclined pressing planes and the cam shaft of the drive chassis can be maintained, for example, even if one pressing piece is resiliently deformed upward. Therefore, it is possible to securely suppress vibrations of the drive chassis for a prolonged period.

The fourth aspect of the invention is a disk player in which a casing for supporting a tray so as to cause the same to advance and retreat is provided; a pair of left and right pivotal supporting axes protruding from the base end portion of a drive chassis having a spindle motor with a turntable and an optical pickup mounted thereon are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing; the tray is caused to advance on the basis of an unloading signal after the cam plate is caused to slide in one direction and the drive chassis is moved downward around both the pivotal supporting axes; and the drive chassis is moved upward, on the basis of a loading signal, around both the pivotal supporting axes by causing the cam plate to slide in the other direction after the tray is retreated; which is featured in that a pair of left and right pressing pieces to press down the front part of the upward moving drive chassis are provided so as to protrude from the front part of the casing integrally therewith, one of both the pressing pieces is formed so as to be resiliently displaced with a protruding portion erected at the tip end thereof, and the outer circumferential face of the protruding portion is made into a tapered pressing plane which is narrowed downwards; a fitting hole is formed on the upper surface of the drive chassis opposite the protruding portion; the protruding portion is fitted into the fitting hole of the upward moving drive chassis, and the inner circumferential edge of the fitting hole is brought into contact with the tapered pressing plane of the protruding portion.

The above-described construction corresponds to the fourth embodiment (Refer to FIGS. 7A to 7C). According to the construction, it is possible to obtain effects similar to those of the first aspect of the invention. In particular, since the tapered pressing plane of one pressing piece is resiliently fitted into the fitting hole of the drive chassis, a resilient contacting state between the above-described tapered pressing plane and the inner circumferential edge of the fitting hole can be maintained, for example, even if one pressing piece is plastically deformed upward. It is possible to securely suppress vibrations of the drive chassis for a prolonged period.

The fifth aspect of the invention is a disk player in which a casing for supporting a tray so as to cause the same to advance and retreat is provided; a pair of left and right pivotal supporting axes protruding from the base end portion of a drive chassis having a spindle motor with a turntable and an optical pickup mounted thereon are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing; the tray is caused to advance on the basis of an unloading signal after the cam plate is caused to slide in one direction and the drive chassis is moved downward around both the pivotal supporting axes; and the drive chassis is moved upward on the basis of a loading signal around both the pivotal supporting axes by causing the cam plate to slide in the other direction after the tray is retreated; which is featured in that a pair of left and right pressing pieces to press down the front part of the upward moving drive chassis are provided so as to protrude from the front part of the casing integrally therewith, both the pressing pieces or one thereof are (or is) formed so as to be resiliently displaced with a protruding portion erected at the tip end thereof; the protruding portion is provided with a vibration absorption feature; and the front part of the upward moving drive chassis is caused to be engaged with the protruding portion via the vibration absorption feature.

According to the above-described construction, since a resilient engaging state can be maintained between the vibration absorption feature added to both pressing pieces or one piece thereof and the front part of the drive chassis when the drive chassis is moved upward and a disk is rotated at a high speed by a spindle motor via a turntable, it is possible to securely suppress vibrations of the drive chassis due to high-speed rotations of the spindle motor for a prolonged period, whereby the optical pickup can precisely follow the tracks, and for example, noise-free high quality images can be reproduced.

It is sufficient that only the vibration absorption feature is provided by adding slight machining to the pressing pieces. The machining requires almost no trouble, and the number of components is not increased. Therefore, the construction is economical.

The sixth aspect of the invention is featured, in addition to the fifth aspect of the invention, in that the vibration absorption feature is composed of an inclined pressing plane which is formed by inclining the inner side of the protruding portion sideward at a prescribed angle so as to be turned downward to be widened outwardly, and the front side edge of the upward moving drive chassis is resiliently brought into contact with the inclined pressing plane.

According to the above-described construction, since the front side edge of the drive chassis is resiliently brought into contact with the pressing plane inclined at a prescribed angle, which is turned downward and widened outwardly, toward the side of the pressing piece when the drive chassis is moved upward and a disk is rotated at a high speed by the spindle motor via the turntable, a resilient contacting state between the above-described inclined pressing plane and the front side edge of the drive chassis can be maintained, for example, even if the pressing piece having the inclined pressing plane is plastically deformed upward. Therefore, it is possible to securely suppress vibrations of the drive chassis for a prolonged period, whereby the optical pickup can precisely follow the tracks, and for example, noise-free high quality images can be reproduced.

Also, it is possible to form the inclined pressing planes by adding slight machining to the pressing pieces, and the machining requires almost no trouble, and the number of components is not increased. Therefore, the construction is economical.

The seventh aspect of the invention is featured, in addition to the fifth aspect or the sixth aspect of the invention, in that the rear end face of the protruding portion is made into an inclined guide plane which is inclined to the forward direction at a prescribed angle so as to be turned downward to be widened outwardly, and the inclined guide plane is resiliently pressed up by the front edge of the drive chassis incorporated in the casing.

According to the above-described construction, since the inclined guide plane of the protruding portion is resiliently pushed up from the front edge of the corresponding drive chassis when incorporating the drive chassis in the casing, and there is no case where the corresponding protruding portion hinders advancement of the drive chassis, the assembling work of the drive chassis can be easily and quickly carried out.

The eighth aspect of the invention is featured, in addition to the fifth aspect of the invention, in that the vibration absorption feature is composed of inclined pressing planes having a recess formed opposite the cam shaft on the underside of the protruding portion, in which both the inner sides of the recess are inclined so as to be narrowed upward; the cam shaft of the upward moving drive chassis is fitted into the recess; and the outer circumferential face of the cam shaft is caused to be brought into contact with both the inclined pressing planes.

According to the above-described construction, effects similar to those of the sixth aspect of the invention can be obtained. Also, in particular, since the cam shaft of the drive chassis is resiliently brought into contact with both the inclined pressing planes, which are inclined so as to be narrowed upward, of the pressing pieces, a resilient contacting state can be maintained between both the inclined pressing planes and the cam shaft of the drive chassis, for example, even if the pressing pieces are plastically deformed upward. Therefore, vibrations of the drive chassis can be securely suppressed for a prolonged period.

The ninth aspect of the invention is featured, in addition to the fifth aspect of the invention, in that the vibration absorption feature is composed of a tapered pressing plane for which the outer circumferential face of the protruding portion is formed to be tapered so as to be narrowed downward, and a fitting hole formed on the upper surface of the drive chassis opposite the protruding portion; and the fitting hole of the upward moving drive chassis is caused to be fitted into the tapered pressing plane of the protruding portion.

According to the above-described construction, effects similar to those of the sixth aspect of the invention can be obtained. In particular, since the tapered pressing plane of the pressing piece is resiliently fitted into the fitting hole of the drive chassis, a resilient contacting state can be maintained between the above-described tapered pressing plane and the inner circumferential edge of the fitting hole, for example, even if the pressing piece is plastically deformed upward. Therefore, it is possible to securely suppress vibrations of the drive chassis.

BRIEF DESCRIPTION OF THE DRAWINGS

These and other objects and advantages of this invention will become more fully apparent from the following detailed description taken with the accompanying drawings in which:

FIG. 8 is a plan view showing a prior art example; and

DETAILED DESCRIPTION OF THE PREFERRED EMBODIMENTS

Figure 1:
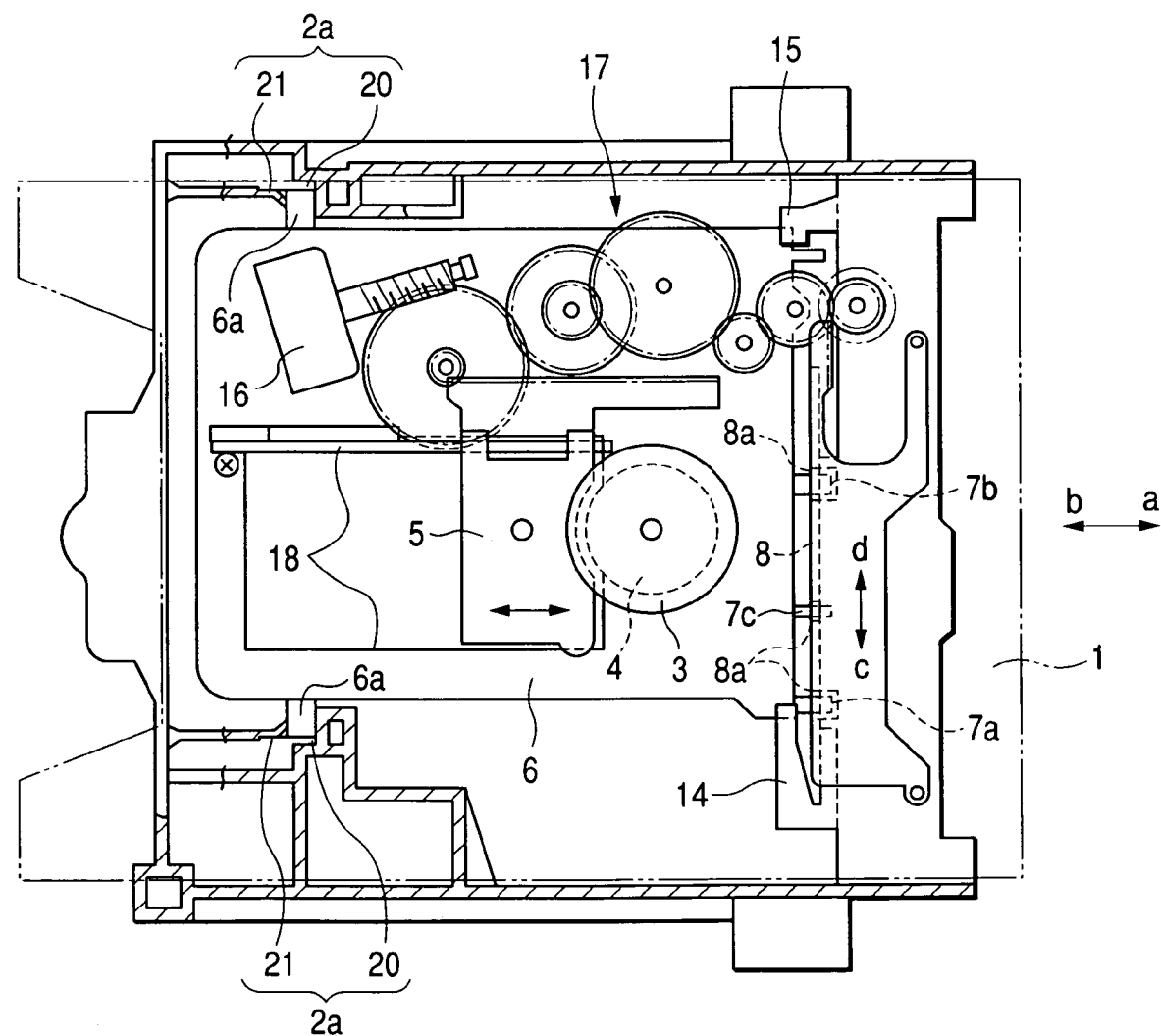
FIG. 1 is a horizontally sectional view of a disk player according to the first embodiment of the invention.
Figure 2:
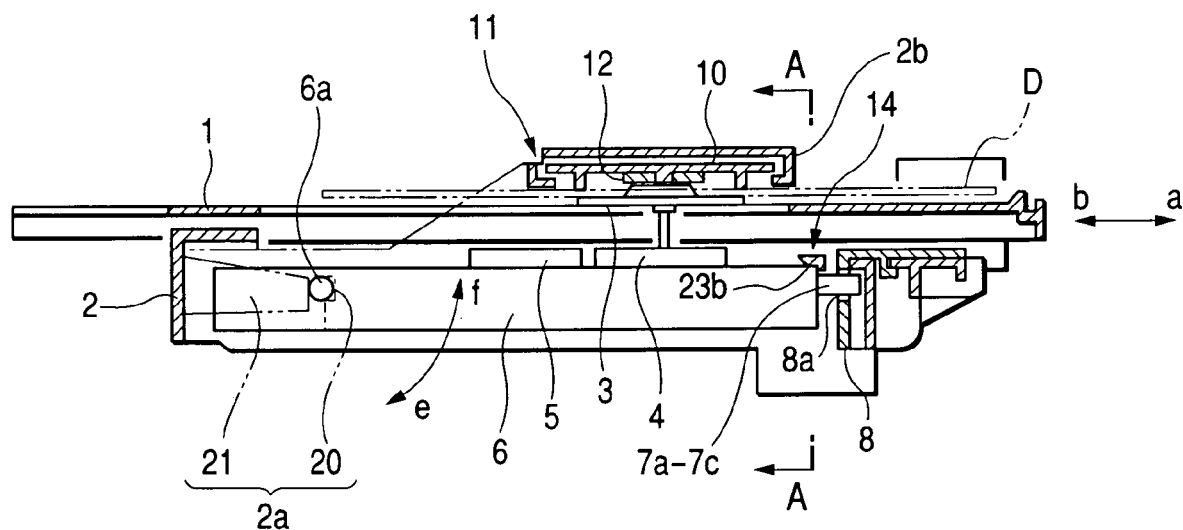
FIG. 2 is a longitudinally sectional view thereof.
Figure 3:
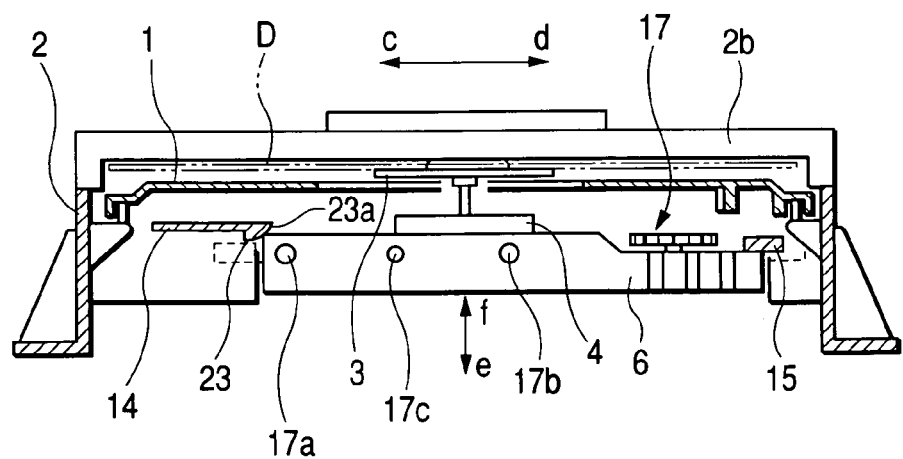
FIG. 3 is a view taken along the line shown by the arrow A—A of FIG. 2.
Figure 9A:
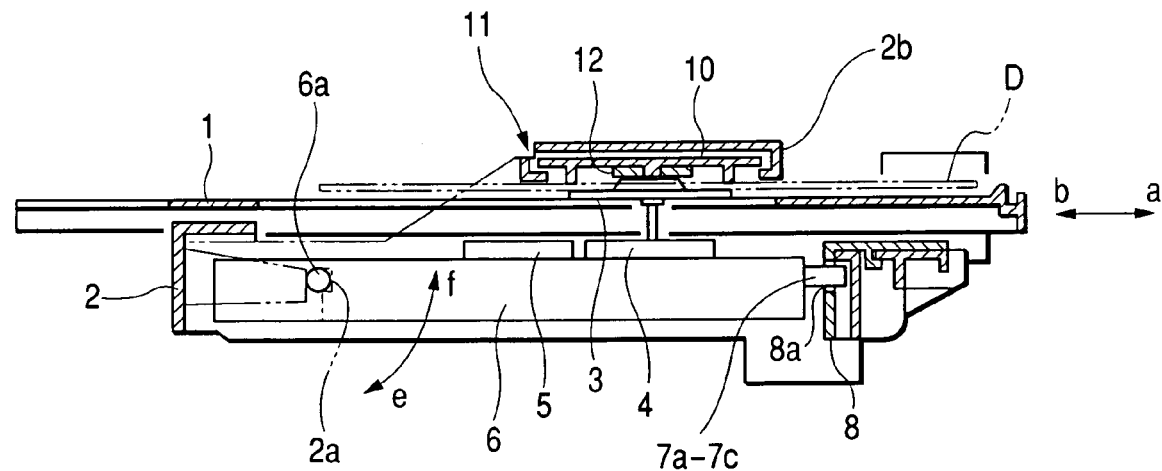
FIG. 9A is a longitudinally-sectional view showing a loading state.
Figure 9B:
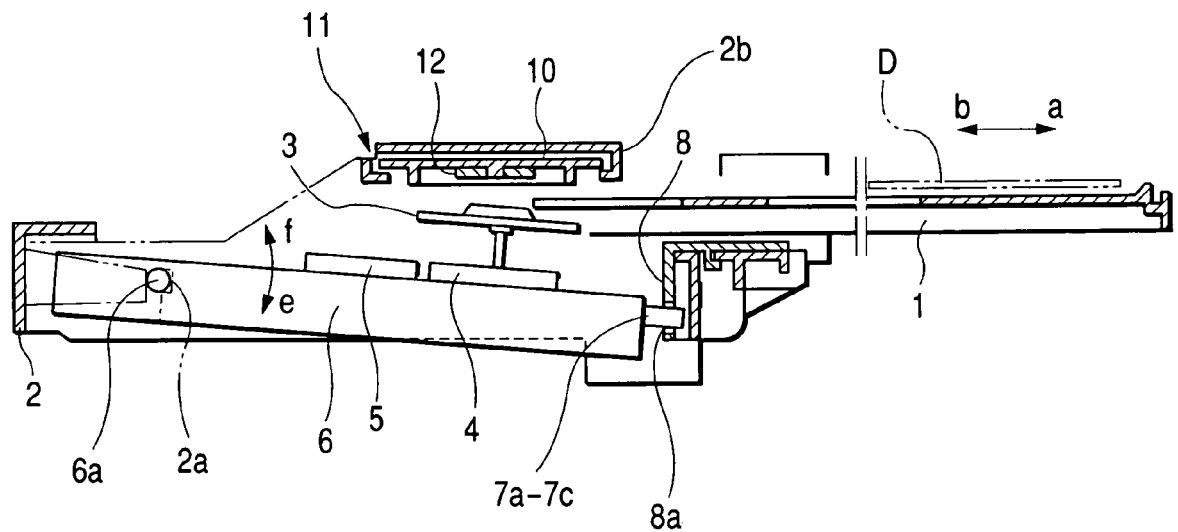
FIG. 9B is a longitudinally-sectional view showing an unloading state.

FIG. 1 through FIG. 3 show the first embodiment of the invention. A pair of left and right pressing pieces 14 and 15, which are provided in order to press the front part of the drive chassis 6 moving upward (f) around both pivotal support axes 6a fitted into the bearings 2a, are provided so as to protrude from the front part of the casing 2. In addition, in FIG. 1, reference number 16 denotes a feed motor. When unloading, the drive chassis 6 is moved downward (e) by causing the cam plate 8 to slide in the right direction (d) via a gear mechanism 17 and a movable cam shaft 7c, and simultaneously, the tray 1 is caused to advance (a) and is caused to retreat (b) via the gear mechanism 17 when loading. At the same time, the drive chassis 6 is moved upward (f) by causing the cam plate 8 to slide in the left direction (c), and the optical pickup 5 is caused to advance (a) and retreat (b) along the guide rail 18. Since the construction other than the above description is almost the same as that shown in FIGS. 8, 9A and 9B, parts which are the same as those of the construction shown in FIGS. 8, 9A and 9B are given the same reference numbers, and the description thereof is omitted.

As shown in FIG. 1 and FIG. 2, the above-described bearing 2a is composed of channel-shaped bearing recesses 20, whose rear side is open, formed in the casing 2, and resilient pieces 21 that close the open port of the corresponding respective bearing recesses 20. Where the drive chassis 6 is incorporated in the casing 2, if the front part of the drive chassis 6 is placed on both pressing pieces 14 and 15 with the casing 2 upside down, both resilient pieces 21 are resiliently deformed to be widened in the left and right directions, and the drive chassis 6 is caused to advance forward (a), whereby respective pivotal support axes 6a may be fitted into respective bearing recesses 20, and respective cam shafts 7a through 7c may be fitted into respective cam holes 8a. (Refer to FIG. 1).

With the above-described construction, since respective pivotal support axes 6a are nipped between the deep end sides of the respective bearing recesses 20 and the tip ends of the respective resilient pieces 21, it is possible to securely suppress vibrations in the forward (a) and backward (b) directions, which are generated in the drive chassis 6 when causing the disk D to rotate at a high speed by the spindle motor 4 via the turntable 3.

Figure 4A:
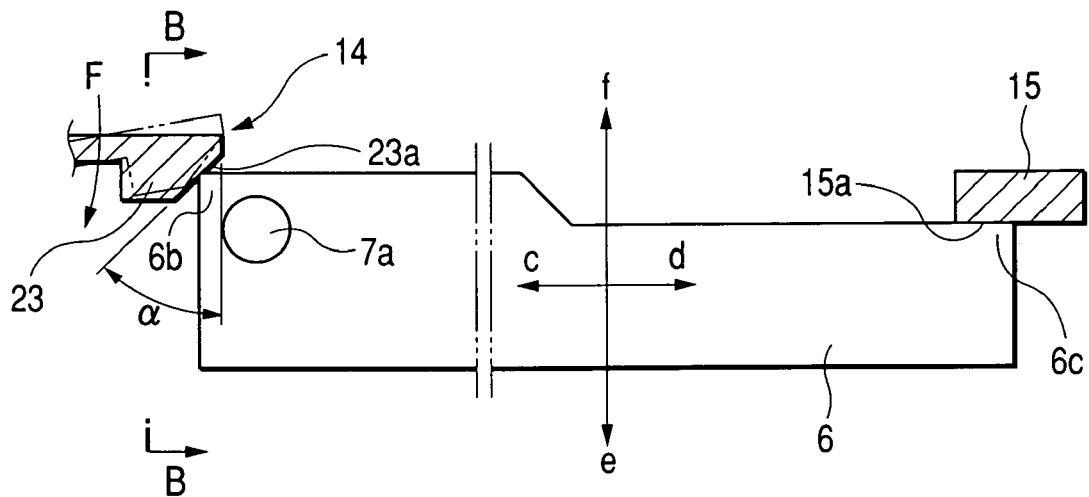
FIG. 4A is a cross-sectional view of the major parts.
Figure 4B:
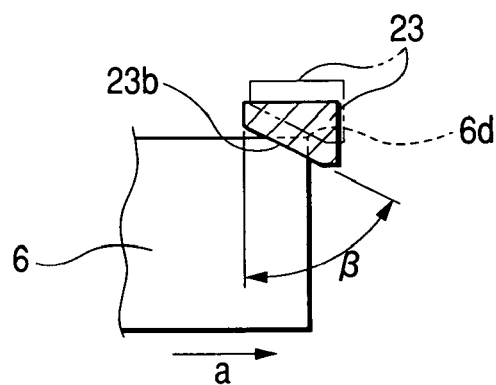
FIG. 4B is a view taken along the line shown by the arrow B—B.
Figure 4C:
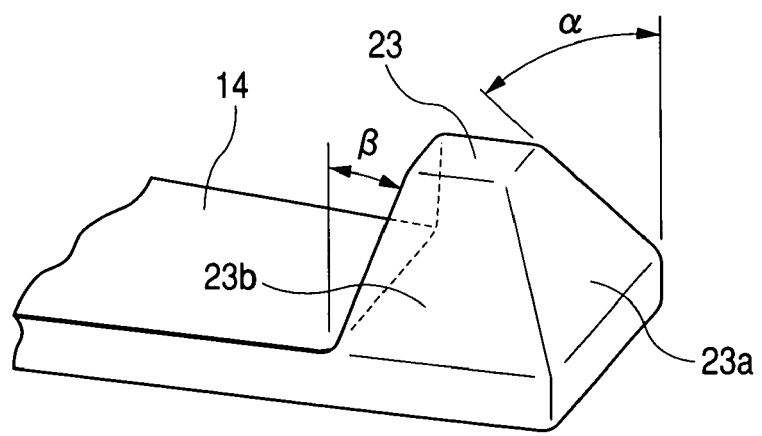
FIG. 4C is a perspective view of the same parts.

As shown in FIG. 1, the left side pressing piece 14 of both pressing pieces 14 and 15 is L-shaped in its plan view, is formed so as to be resiliently deformable in the vertical direction centering around the root portion thereof, and at the same time, a protruding portion 23 is provided so as to protrude from the underside of the tip end thereof. As shown in FIGS. 4A to 4C, the inner side of the protruding portion 23 is made into a pressing plane (vibration absorption feature) 23a inclined at a prescribed angle α (for example, 45 degrees) in the left direction (c), which is turned downward so as to be widened outwardly, and the underside of the right side pressing piece 15 is made into a flat pressing plane 15a.

In the above-described construction, by causing the drive chassis 6 to move upward (f) around both pivotal support axes 6a, both side edges 6b and 6c of the front part of the corresponding drive chassis 6 are, respectively, brought into contact with the inclined pressing plane 23a of the left side pressing piece 14 and the flat pressing plane 15a of the right side pressing piece 15, whereby a downward resilient force F is generated in the left side pressing piece 14 which is slightly pressed up. With the resilient force F, the front side edge 6b of the drive chassis 6 is resiliently brought into contact with the inclined pressing plane 23a. Therefore, as shown with hypothetical lines in FIG. 4A, since a resilient contacting state is maintained between the inclined pressing plane 23a and the front side edge 6b of the drive chassis 6, for example, even if the left side pressing piece 14 is plastically deformed upward, it is possible to securely suppress vibrations of the drive chassis 6 in the upward (e) and downward (f) directions and in the left (c) and right (d) directions for a prolonged period. Accordingly, the optical pickup 5 can precisely follow the tracks, and, for example, noise-free high quality images can be reproduced.

As shown in FIGS. 4B and 4C, the rear end face of the above-described protruding portion 23 is made into a guide plane 23b inclined at a prescribed angle β (for example, 65 degrees) in the forward (a) direction, which is turned downward so as to be widened outwardly.

In the above-described construction, as described above, since, when the drive chassis 6 is caused to advance forward (a) and is assembled in the casing 2, the inclined guide plane 23b is resiliently pushed up by the front edge 6d of the drive chassis 6 (Refer to the hypothetical lines in FIG. 4B) and the protruding portion 23 does not hinder the advancement (a) of the drive chassis 6, the assembling work of the drive chassis 6 can be quickly and easily carried out.

According to the above-described construction, since the inclined pressing plane 23a and inclined guide plane 23b can be formed by adding slight machining to the left side pressing piece 14, the machining requires almost no trouble, and the number of components is not increased. The construction is economical.

Figure 5:
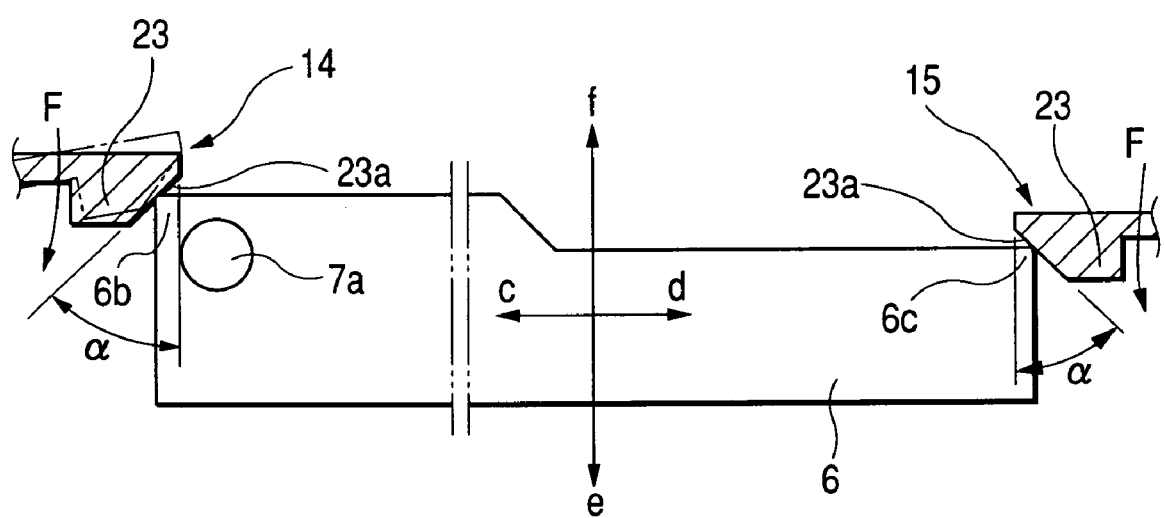
FIG. 5 is a cross-sectional view of the major parts of a disk player according to the second embodiment of the invention.

Although, in the first embodiment, the left side pressing piece 14 is resiliently deformable and the protruding portion 23 having the inclined pressing plane 23*a* and inclined guide plane 23*b* is provided so as to protrude from the tip end thereof, as shown in FIG. 5, the right side pressing piece 15 may be formed as in the left side pressing piece 14. With this construction, effects similar to those of the first embodiment can be obtained. In particular, since the front part of the drive chassis 6 is nipped from both the sides thereof by the inclined pressing plane 23*a* of both pressing pieces 14 and 15, a resilient contacting state can be maintained between both the above-described inclined pressing planes 23*a* and the both the front side edges 6*b* and 6*c* of the drive chassis 6, for example, even if both the pressing pieces 14 and 15 are plastically deformed upward. Therefore, vibrations of the drive chassis 6 in the upward (e) and downward (f) directions and left (c) and right (d) directions can be further securely suppressed for a prolonged period (The second embodiment).

Figure 6A:
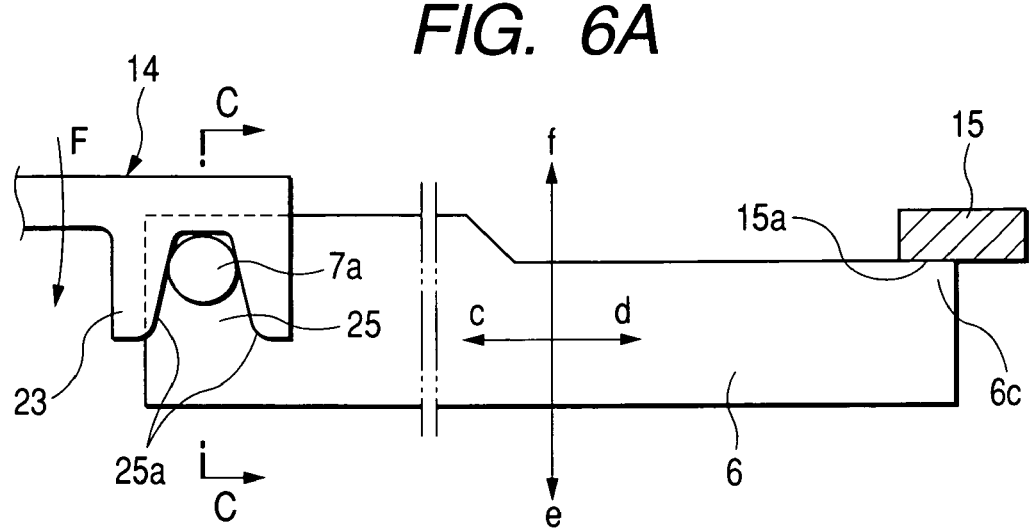
FIG. 6A is a cross-sectional view of the major parts of a disk player according to the third embodiment of the invention.
Figure 6B:
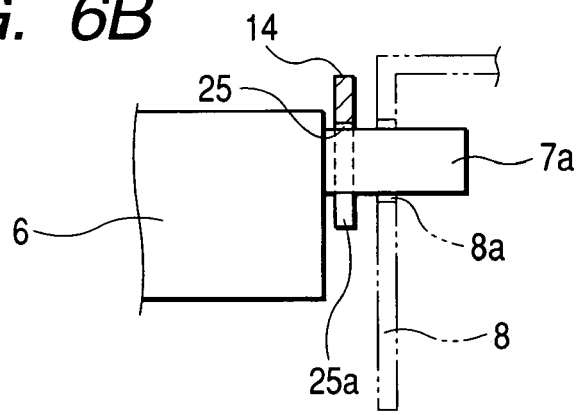
FIG. 6B is a view taken along the line shown by the arrow C—C.
Figure 6C:
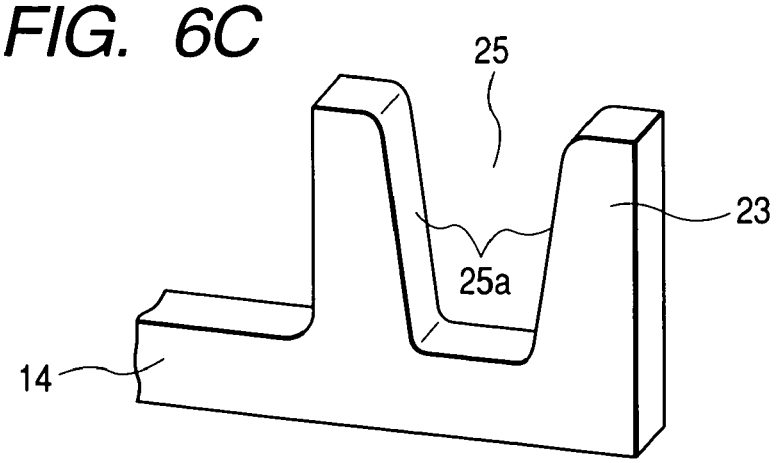
FIG. 6C is a perspective view of the same major parts.

FIGS. 6A to 6C show the third embodiment of the invention. A recess 25 is formed on the underside of the protruding portion 23 of the left side pressing piece 14 opposite the left side cam shaft 7*a*, and at the same time, both inside faces of the corresponding recess 25 are made into an inclined pressing plane (vibration absorption feature) 25*a* which is narrowed upward, wherein the left side cam shaft 7*a* of the upward (f) moving drive chassis 6 is fitted into the recess 25, and the outer circumferential face of the corresponding left side cam shaft 7*a* is formed so that it is brought into contact with both inclined pressing planes 25*a*. Since the construction other than the above description is almost the same as that of the first embodiment (Refer to FIG. 1 through FIGS. 4A to 4C), parts which are the same as those of the first embodiment are given the same reference numbers, and description thereof is omitted.

According to the above-described construction, effects which are almost the same as those of the first embodiment can be obtained. In particular, since the left side cam shaft 7*a* of the drive chassis 6 is resiliently brought into contact with both the pressing planes 25*a*, which are narrowed upward, of the left side pressing piece 14, a resilient contacting state can be maintained between both the inclined pressing planes 25*a* and the left side cam shaft 7*a*, for example, even if the left side pressing piece 14 is plastically deformed upward. Therefore, it is possible to securely suppress vibrations of the drive chassis 6 in the upward (e) and downward (f) directions and the left (c) and right (d) directions for a prolonged period.

Figure 7A:
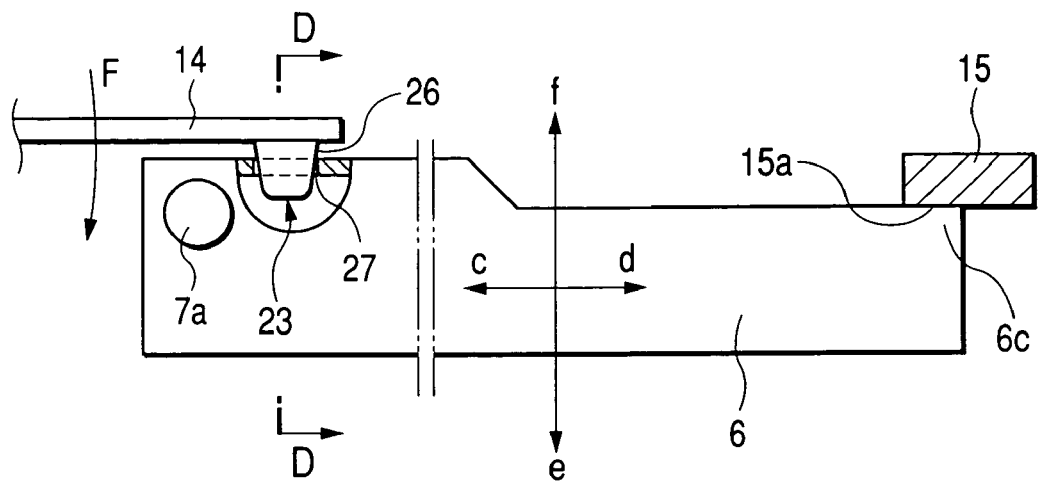
FIG. 7A is a cross-sectional view of the major parts of a disk player according to the fourth embodiment of the invention.
Figure 7B:
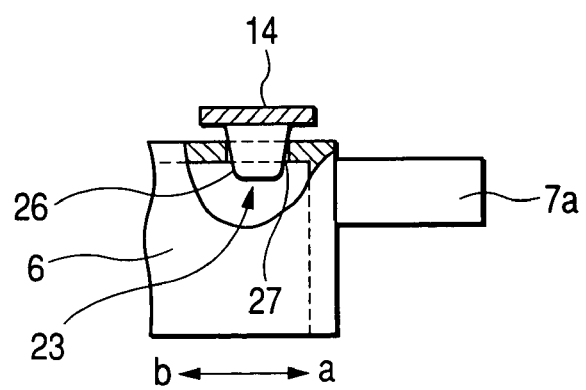
FIG. 7B is a view taken along the line shown by the arrow D—D.
Figure 7C:
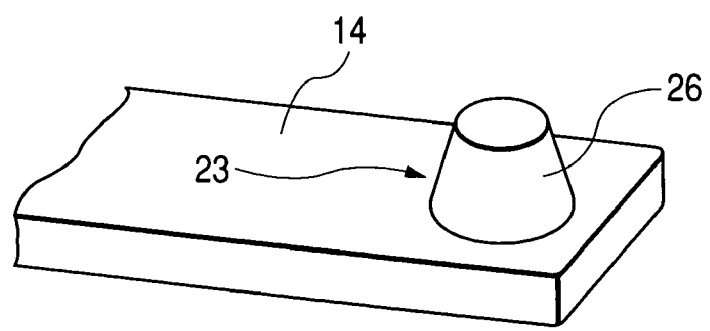
FIG. 7C is a perspective view of the same major parts.

FIGS. 7A to 7C show the fourth embodiment of the invention. The outer circumferential face of the protruding portion 23 of the left side pressing piece 14 is made into a tapered pressing plane (vibration absorption feature) 26 which is narrowed downward. A fitting hole 27 is formed on the upper surface of the drive chassis 6 opposite the protruding portion 23, and the protruding portion 23 is fitted into the fitting hole 27 of the upward (f) moving drive chassis 6, wherein the inner circumferential edge of the corresponding fitting hole 27 is formed so that it is brought into contact with the tapered pressing plane 26 of the protruding portion 23. Since the construction other than the above description is almost the same as that of the first embodiment (Refer to FIG. 1 through FIGS. 4A to 4C), parts which are the same as those of the first embodiment are given the same reference numbers, and description thereof is omitted.

According to the above-described construction, effects similar to those of the first embodiment can be obtained. In particular, since the tapered pressing plane 26 of the left side pressing piece 14 is resiliently fitted into the fitting hole 27 of the drive chassis 6, a resilient contacting state can be maintained between the above-described tapered pressing plane 26 and the inner circumferential edge of the fitting hole 27, for example, even if the left side pressing piece 14 is plastically deformed upward. Therefore, it is possible to securely suppress vibrations of the drive chassis 6 in the upward (e) and downward (f) directions and the left (c) and right (d) directions for a prolonged period.

According to the first aspect of the invention, as shown in the first embodiment (Refer to FIG. 1 through FIGS. 4A to 4C), the front side edge of the drive chassis is resiliently brought into contact with a pressing plane inclined at a prescribed angle, which is turned downward so as to be widened outwardly, toward the side of one pressing piece when the drive chassis is moved upward and a disk is rotated at a high speed by a spindle motor via a turntable. Therefore, since a resilient contacting state can be maintained between the above-described inclined pressing plane and the front side edge of the drive chassis, even if, for example, one pressing piece is plastically deformed upward, vibrations of the drive chassis can be suppressed without fail for a prolonged period, whereby an optical pickup can precisely follow the tracks, and for example, noise-free high quality images can be reproduced.

Also, the inclined guide plane of the protruding portion is resiliently pushed up by the front edge of the drive chassis, and there is no case where the corresponding protruding portion hinders advancement of the drive chassis. Therefore, it is possible to easily and quickly carry out assembly of the drive chassis.

Furthermore, only by adding slight machining to the pressing piece, it is possible to form the inclined pressing plane and inclined guide plane. The machining requires almost no trouble, and the number of components is not increased. Therefore, the construction is economical.

According to the second aspect of the invention as shown in the second embodiment (Refer to FIG. 5)., it is possible to obtain effects similar to those of the first aspect of the invention. In particular, since the front part of the drive chassis is nipped at both sides thereof by the inclined pressing planes of both the pressing pieces, a resilient contacting state between both the inclined pressing planes and both side edges of the front part of the drive chassis can be maintained, for example, even if both the pressing pieces are plastically deformed upward. Therefore, it becomes possible to further securely suppress vibrations of the drive chassis for a prolonged period.

According to the third aspect of the invention, as shown in the third embodiment (Refer to FIGS. 6A to 6C), the construction can bring about effects similar to those of the first aspect of the invention. In particular, since the cam shaft of the drive chassis is resiliently brought into contact with both the inclined pressing planes, which are inclined so as to be narrowed upward, of one pressing piece, a resilient contacting state between both the inclined pressing planes and the cam shaft of the drive chassis can be maintained, for example, even if one pressing piece is plastically deformed upward. Therefore, it is possible to securely suppress vibrations of the drive chassis for a prolonged period.

According to the fourth aspect of the invention, as shown in the fourth embodiment (Refer to FIGS. 7A to 7C), it is possible to obtain effects similar to those of the first aspect of the invention. In particular, since the tapered pressing plane of one pressing piece is resiliently fitted into the fitting hole of the drive chassis, a resilient contacting state between the above-described tapered pressing plane and the inner circumferential edge of the fitting hole can be maintained, for example, even if one pressing piece is plastically deformed upward. Therefore, it is possible to securely suppress vibrations of the drive chassis for a prolonged period.

According to the fifth aspect of the invention, since a resilient engaging state can be maintained between the vibration absorption feature added to both pressing pieces or one piece thereof and the front part of the drive chassis when the drive chassis is moved upward and a disk is rotated at a high speed by a spindle motor via a turntable, it is possible to securely suppress vibrations of the drive chassis due to high-speed rotations of the spindle motor for a prolonged period, whereby the optical pickup can precisely follow the tracks, and for example, noise-free high quality images can be reproduced.

It is sufficient that only the vibration absorption feature is provided by adding slight machining to the pressing pieces. The machining requires almost no trouble, and the number of components is not increased. Therefore, the construction is economical.

According to the sixth aspect of the invention, since the front side edge of the drive chassis is resiliently brought into contact with the pressing plane inclined at a prescribed angle, which is turned downward and widened outwardly, toward the side of the pressing piece when the drive chassis is moved upward and a disk is rotated at a high speed by the spindle motor via the turntable, a resilient contacting state between the above-described inclined pressing plane and the front side edge of the drive chassis can be maintained, for example, even if the pressing piece having the inclined pressing plane is plastically deformed upward. Therefore, it is possible to securely suppress vibrations of the drive chassis for a prolonged period, whereby the optical pickup can precisely follow the tracks, and for example, noise-free high quality images can be reproduced.

Also, it is possible to form the inclined pressing planes by adding slight machining to the pressing pieces, and the machining requires almost no trouble, and the number of components is not increased. Therefore, the construction is economical.

According to the seventh aspect of the invention, since the inclined guide plane of the protruding portion is resiliently pushed up from the front part of the corresponding drive chassis when incorporating the drive chassis in the casing, and there is no case where the corresponding protruding portion hinders advancement of the drive chassis, the assembling work of the drive chassis can be easily and quickly carried out.

According to the eighth aspect of the invention, effects similar to those of the sixth aspect of the invention can be obtained. Also, in particular, since the cam shaft of the drive chassis is resiliently brought into contact with both the inclined pressing planes, which are inclined so as to be narrowed upward, of the pressing pieces, a resilient contacting state can be maintained between both the inclined pressing planes and the cam shaft of the drive chassis, for example, even if the pressing pieces are plastically deformed upward. Therefore, vibrations of the drive chassis can be securely suppressed for a prolonged period.

According to the ninth aspect of the invention, effects similar to those of the sixth aspect of the invention can be obtained. In particular, since the tapered pressing plane of the pressing piece is resiliently fitted into the fitting hole of the drive chassis, a resilient contacting state can be maintained between the above-described tapered pressing plane and the inner circumferential edge of the fitting hole, for example, even if the pressing piece is plastically deformed upward. Therefore, it is possible to securely suppress vibrations of the drive chassis for a prolonged period.

What is claimed is:

1. A disk player comprising:
   a casing for supporting a tray so as to cause the same to advance and retreat;
   a drive chassis having a spindle motor with a turntable and an optical pickup mounted thereon;
   a pair of left and right pressing pieces that are provided so as to protrude from the front part of the casing integrally therewith, for pressing down the front part of the upward moving drive, wherein:
   a pair of left and right pivotal supporting axes protruding from the base end portion of the drive chassis are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing;
   the tray is caused to advance on the basis of an unloading signal after the cam plate is caused to slide in one direction and the drive chassis is moved downward around both the pivotal supporting axes;
   the drive chassis is moved upward on the basis of a loading signal around both the pivotal supporting axes by causing the cam plate to slide in the other direction after the tray is retreated;
   one of both the pressing pieces is formed so as to be resiliently displaced with a protruding portion erected at the tip end thereof, and the inner side of the protruding portion is made into an inclined pressing plane which is inclined sideward at a prescribed angle so that it is turned downward so as to be widened outwardly;
   the front part side edge of the upward moving drive chassis is formed so as to be resiliently brought into contact with the inclined pressing plane thereof, and the rear end face of the protruding portion is made into an inclined guide plane that is turned downward at a prescribed angle in the forward direction to be inclined downward so as to be widened outwardly; and
   the inclined guide plane is devised to be resiliently pressed up from the front edge of the drive chassis incorporated in the casing.

2. A disk player comprising:
   a casing for supporting a tray so as to cause the same to advance and retreat;
   a drive chassis having a spindle motor with a turntable and an optical pickup mounted thereon; and
   a pair of left and right pressing pieces that are provided so as to protrude from the front part of the casing integrally therewith, for pressing down the front part of the upward moving drive chassis, wherein:
   a pair of left and right pivotal supporting axes protruding from the base end portion of the drive chassis are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing;

the tray is caused to advance on the basis of an unloading signal after the cam plate is caused to slide in one direction and the drive chassis is moved downward around both the pivotal supporting axes;

the drive chassis is moved upward on the basis of a loading signal around both the pivotal supporting axes by causing the cam plate to slide in the other direction after the tray is retreated;

both the pressing pieces are formed so as to be resiliently displaced with a protruding portion erected at the tip ends thereof, and the inner sides of the protruding portions are made into inclined pressing planes which are inclined sideward at a prescribed angle so that they are turned downward so as to be widened outwardly;

both the front part side edges of the upward moving drive chassis are formed so as to be resiliently brought into contact with both the inclined pressing planes thereof, and the rear end faces of the respective protruding portions are made into inclined guide planes that are turned downward at a prescribed angle in the forward direction to be inclined downward so as to be widened outwardly; and the inclined guide planes are devised to be resiliently pressed up from the front edge of the drive chassis incorporated in the casing.

3. A disk player comprising:

a casing for supporting a tray so as to cause the same to advance and retreat;

a drive chassis having a spindle motor with a turntable and an optical pickup mounted thereon;

a pair of left and right pressing pieces that are provided so as to protrude from the front part of the casing integrally therewith, for pressing down the front part of the upward moving drive chassis, wherein:

a pair of left and right pivotal supporting axes protruding from the base end portion of the drive chassis are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing;

the tray is caused to advance on the basis of an unloading signal after the cam plate is caused to slide in one direction and the drive chassis is moved downward around both the pivotal supporting axes;

the drive chassis is moved upward on the basis of a loading signal around both the pivotal supporting axes by causing the cam plate to slide in the other direction after the tray is retreated;

one of both the pressing pieces is formed so as to be resiliently displaced with a protruding portion erected at the tip end thereof;

a recess is formed on the underside of the protruding portion opposite to the cam shaft, and both the inner sides of the recess are made into inclined pressing planes which are narrowed down upwardly; and the cam shaft of the upward moving drive chassis is fitted into the recess and the outer circumferential surface of the cam shaft is formed so as to be brought into contact with both the inclined pressing planes.

4. A disk player comprising:

a casing for supporting a tray so as to cause the same to advance and retreat;

a drive chassis having a spindle motor with a turntable and an optical pickup mounted thereon;

a pair of left and right pressing pieces that are provided so as to protrude from the front part of the casing integrally therewith, for pressing down the front part of the upward moving drive chassis, wherein:

a pair of left and right pivotal supporting axes protruding from the base end portion of the drive chassis are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing;

the tray is caused to advance on the basis of an unloading signal after the cam plate is caused to slide in one direction and the drive chassis is moved downward around both the pivotal supporting axes;

the drive chassis is moved upward, on the basis of a loading signal, around both the pivotal supporting axes by causing the cam plate to slide in the other direction after the tray is retreated;

one of both the pressing pieces is formed so as to be resiliently displaced with a protruding portion erected at the tip end thereof, and the outer circumferential face of the protruding portion is made into a tapered pressing plane which is narrowed downwards;

a fitting hole is formed on the upper surface of the drive chassis opposite the protruding portion; and the protruding portion is fitted into the fitting hole of the upward moving drive chassis, and the inner circumferential edge of the fitting hole is brought into contact with the tapered pressing plane of the protruding portion.

5. A disk player comprising:

a casing for supporting a tray so as to cause the same to advance and retreat;

a drive chassis having a spindle motor with a turntable and an optical pickup mounted thereon;

a pair of left and right pressing pieces that are provided so as to protrude from the front part of the casing integrally therewith, for pressing down the front part of the upward moving drive chassis, wherein:

a pair of left and right pivotal supporting axes protruding from the base end portion of the drive chassis are inserted into bearings secured at the rear side of the casing and is fitted into a cam hole of a cam plate on which a cam shaft protruding from the tip end portion of the drive chassis is slidably disposed in the left and right direction orthogonal to the forward and rearward direction at the front portion of the casing;

the tray is caused to advance on the basis of an unloading signal after the cam plate is caused to slide in one direction and the drive chassis is moved downward around both the pivotal supporting axes;

the drive chassis is moved upward on the basis of a loading signal around both the pivotal supporting axes by causing the cam plate to slide in the other direction after the tray is retreated;

both the pressing pieces or one thereof is formed so as to be resiliently displaced with a protruding portion erected at the tip end thereof;

the protruding portion is provided with a vibration absorption feature; and the front part of the upward moving drive chassis is caused to be engaged with the protruding portion via the vibration absorption feature.

6. The disk player according to claim 5, wherein
the vibration absorption feature is composed of an inclined pressing plane which is formed by inclining the inner side of the protruding portion sideward at a prescribed angle so as to be turned downward to be widened outwardly, and the front side edge of the upward moving drive chassis is resiliently brought into contact with the inclined pressing plane.

7. The disk player according to claim 5, wherein
the rear end face of the protruding portion is made into an inclined guide plane which is inclined to the forward direction at a prescribed angle so as to be turned downward to be widened outwardly, and the inclined guide plane is resiliently pressed up by the front edge of the drive chassis incorporated in the casing.

8. The disk player according to claim 5, wherein:
the vibration absorption feature is composed of inclined pressing planes having a recess formed opposite the cam shaft on the underside of the protruding portion, in which both the inner sides of the recess are inclined so as to be narrowed upward;
the cam shaft of the upward moving drive chassis is fitted into the recess; and
the outer circumferential face of the cam shaft is caused to be brought into contact with both the inclined pressing planes.

9. A disk player as set forth in claim 5, wherein:
the vibration absorption feature is composed of a tapered pressing plane for which the outer circumferential face of the protruding portion is formed to be tapered so as to be narrowed downward, and a fitting hole formed on the upper surface of the drive chassis opposite the protruding portion; and
the fitting hole of the upward moving drive chassis is caused to be fitted into the tapered pressing plane of the protruding portion.

* * * * *